G. MILLER.
SPRING TIRE.
APPLICATION FILED MAY 23, 1914.

1,125,864.

Patented Jan. 19, 1915.

Witnesses
Robert M. Sutphen
Edwin S. Clarkson

Inventor
George Miller.

By Edw. W. Kibbey.
Attorney

UNITED STATES PATENT OFFICE.

GEORGE MILLER, OF BUFFALO, NEW YORK.

SPRING-TIRE.

1,125,864.

Specification of Letters Patent.

Patented Jan. 19, 1915.

Application filed May 23, 1914. Serial No. 840,573.

*To all whom it may concern:*

Be it known that I, GEORGE MILLER, a citizen of the United States, residing at Buffalo, in the county of Erie and State of New York, have invented certain new and useful Improvements in Spring-Tires, of which the following is a specification.

My invention relates to improvements in resilient tires for wheels of all classes of vehicles, and aims to provide a novel and improved tire which shall be capable of supplanting the ordinary pneumatic tire, which shall have the good characteristics and qualities of such tires, and which shall also eliminate the objectionable features thereof.

The main object of my invention is to provide in combination with the felly of the wheel, and a tire spaced therefrom, a novel yielding or spring structure between the felly and the tire permitting the tire to yield in various directions in the vertical plane of the wheel, in connection with means for closing the space between the felly and the tire and for constraining the tire against lateral displacement, and at the same time permitting the tire to yield in an easy manner.

Another object of my invention is to do away with the necessity of using rubber tires by providing a tire made up of rigid material which is so constructed that the same can be applied to almost any wheel now in use.

It is also an object of this invention to provide a tire of extremely simple, strong, durable and efficient construction, which can be manufactured at a small cost, effective in operation, and which will embody to a marked degree the requisite characteristics of resiliency without being open to the many objections incidental to the use of tires of the pneumatic type.

A further object of my invention is to provide a spring tire having a series of springs of peculiar form so constructed and arranged that the strain of the weight of the vehicle is distributed over a number of the springs. The springs are also arranged in such a manner as to permit their removal in case one should break and another easily and readily put in its place.

With the foregoing general objects mentioned, and other objects in view which will appear hereafter, the invention resides in the combinations and arrangements of parts and in the details of construction herein- after described and claimed, it being understood that changes in the precise embodiment of invention herein disclosed can be made within the scope of the claims without departing from the spirit of the invention.

Figure 1:
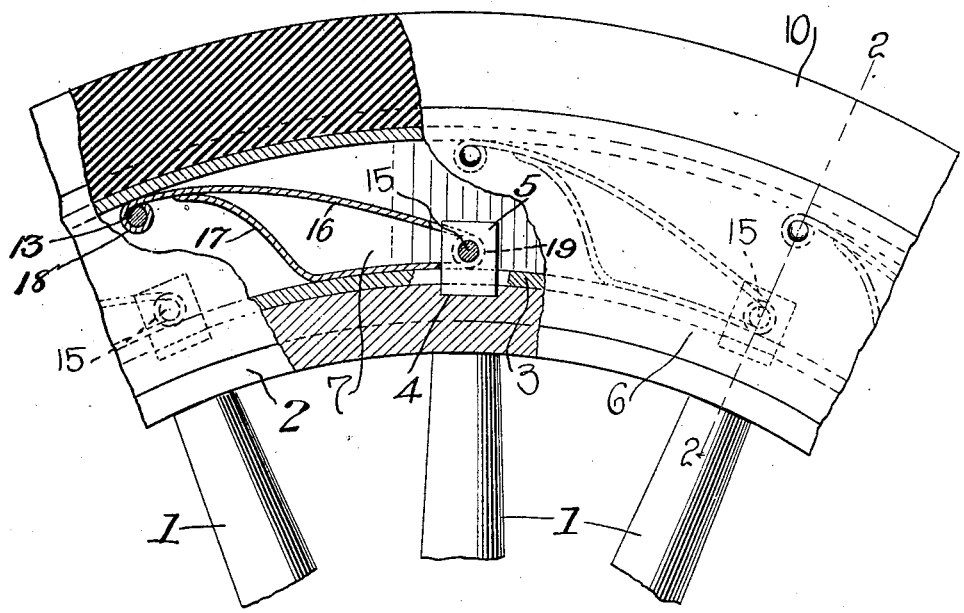
Figure 2:
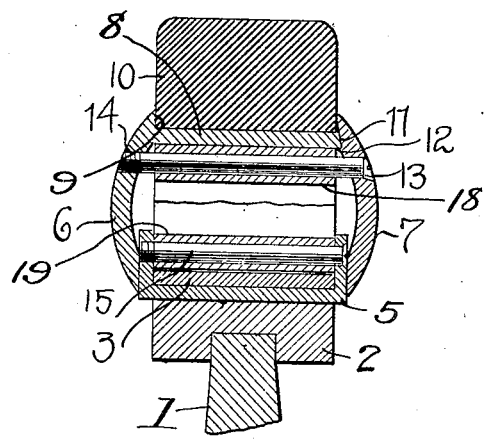

In the drawings: Figure 1 is a part elevation and part section of a portion of a wheel embodying my invention. Fig. 2 is a transverse section of Fig. 1 in a plane transverse to the wheel axis.

The reference number 1 designates the spoke of a wheel and 2 the felly thereof.

3 designates an annular metallic binder suitably secured to the rim, said rim having notched portions 4 throughout its periphery.

U-shape bars 5 are secured in the notched portions 4 of the rim 2 by means of the binder 3, the said bars having suitable bolt openings in alinement with each other. There are a series of these bars disposed radially throughout the periphery of the felly.

The casing for the tread comprises two members 6 and 7. The member 6 has an integral tread portion 8 one side of which is provided with a shoulder 9 against which the tire 10 is compressed by the member 7, as will be hereinafter explained. The member 7 is provided at its outer edge with an undercut 11 and adapted to receive the tread portion 8 of the member 6, the tread portion 8 having a bearing on a shoulder 12 formed at the bottom of the undercut 11.

13 is a bolt which passes through an opening in the member 7 and has screw threaded engagement with member 6 as at 14, whereby the two members of the casing are firmly secured together and the tire 10 rigidly clamped therebetween. The upper end of the casing members 6 and 7 having a sliding bearing on the outer faces of the U-shape bars 5.

Within the casing I mount a series of cushion springs, which are spaced bodily apart and each spring is secured at one point to the casing, by means of the bolt 13, and to the felly by means of the bolt 15, mounted in the U-shape bar 5, so that while the casing is free to move bodily in the vertical plane of the wheel, it is held against relative peripheral movement with the rim.

The compression springs are all of the same construction, therefore a description of one will suffice. The compression spring is composed of a single piece of flat spring metal bent upon itself to form a member 16 and a member 17; the member 17 is given a curvature concentric with the periphery of the binder 3 for a portion of its length, the remaining portion thereof being deflected toward, and having a sliding bearing on, the portion 16. The free end of the portion 16 is rebent to form an eye 18 through which the bolt 13 passes, whereby, the spring is anchored to the casing. The spring is anchored to the felly by means of the bolt 15 passing between the members 16 and 17 and lying snug within the rebent portion 19 of the spring.

In operation pressure exerted on the casing, incident to its contact with road surface, or an obstruction, and the shock incident to such pressure is first communicated to, and partially absorbed by, the member 16 of the spring, the shock being further absorbed by movement in the plane of the wheel of the casing by the spring or springs diametrically opposite the spring first receiving the shock. Further absorption of the shock is taken up by the member 17 of the spring having its end free to slide on the member 16 whereby I am able to utilize the shock absorbing qualities of the member 17, which has a snug fit, for a portion of its length, against the periphery of the binder 3 as will be readily understood.

The shock to any one of the springs is, to a certain degree, absorbed by all of the springs more or less.

What I claim is:

1. In a wheel the combination with a wheel and a hollow tread casing mounted on the wheel and free to slide in the vertical plane of the wheel of a series of cushion springs disposed in said casing and bodily spaced apart; said springs each comprising a single flat body bent upon itself to form spaced members, one member having a portion thereof deflected toward the other and having a sliding bearing on the other member, the said other member being anchored to the casing while the spring is anchored at the jointure of the two members to the wheel.

2. In a wheel the combination with spokes and a felly rigidly secured thereto, and having a notched portion, of a U-shape bar in said notched portion of the felly, a binder securing said U-shaped bar in said notched portion, said U-shape bar having bolt openings in alinement with each other, a flat spring bolted at one end in said U-shape bar and having a portion of its inner section bearing on the felly, a casing section comprising a tread portion and a side portion, said tread portion having a shoulder against which a tire is compressed by a second casing section, secured at its outer end to the first named casing section, a bolt securing said sections together, the other end of the spring being anchored to said bolt, the inner ends of said casing sections having a sliding contact with the said felly.

In testimony whereof I affix my signature in presence of two witnesses.

GEORGE MILLER.

Witnesses:
EDWIN S. CLARKSON,
JOHN C. KERN.